United States Patent [19]

Bay

[11] Patent Number: 5,120,290
[45] Date of Patent: Jun. 9, 1992

[54] SYSTEM FOR POSITIONING CUTTING AND FOLDING COMPUTER GENERATED DRAWING PAGES

[76] Inventor: Otto Bay, Luzernstrasse 45, CH-4553 Subingen, Switzerland

[21] Appl. No.: 617,891

[22] Filed: Nov. 26, 1990

[51] Int. Cl.$^5$ .................. B43L 13/00; B41F 13/58; B41F 13/60
[52] U.S. Cl. ....................... 493/14; 493/29; 83/47; 83/371; 83/408; 101/483
[58] Field of Search .............. 101/483; 83/45, 47, 83/371, 408; 493/1, 14, 22, 23, 29, 320, 324, 356, 357, 361, 362

[56] References Cited

U.S. PATENT DOCUMENTS

| | | | |
|---|---|---|---|
| 3,728,920 | 4/1973 | Gardner et al. | 83/106 |
| 3,961,781 | 6/1976 | Funk | 493/320 |
| 4,009,956 | 3/1977 | Ritzerfeld | 83/482 |
| 4,463,677 | 8/1984 | Kuehfuss | 83/371 |
| 4,506,824 | 3/1985 | Bartz | 83/371 |
| 4,768,410 | 9/1988 | Wood | 83/371 |
| 4,768,767 | 9/1988 | Orr et al. | 493/14 |
| 4,784,318 | 11/1988 | Bay | 234/2 |
| 4,785,165 | 11/1988 | Kruk | 235/375 |
| 4,900,001 | 2/1990 | Lapeyre | 493/320 |

FOREIGN PATENT DOCUMENTS 3604806 8/1987 Fed. Rep. of Germany .

Primary Examiner—William E. Terrell
Attorney, Agent, or Firm—Frishauf, Holtz, Goodman & Woodward

[57] ABSTRACT

A plotter (1) provides, in accordance with command inputs, drawings on a web (2) of predetermined width; the drawings may have different sizes or formats, and are provided by the plotter for optimal distribution of the sheets across the width (B) of the web. These drawings are placed on the web in groups, and the web is then cut longitudinally as well as transversely to provide the individual sheets which are fed on a separating table. The separating table is provided with longitudinal and transverse feeding systems (6, 56, 14, 24, 61, 63, 15, 15'), and with electric eyes or opto-electric gates (10-13) which, selectively, control longitudinal and transverse feeding apparatus to move the sheets against a reference or alignment rail (25) from where they are then fed sequentially, individually, to a folding apparatus (5). The systems permits automatic cutting and folding of drawing sheets, for example, from a web in accordance with the formats of the sheets, which are known from the plotter program.

19 Claims, 4 Drawing Sheets

SYSTEM FOR POSITIONING CUTTING AND FOLDING COMPUTER GENERATED DRAWING PAGES

Reference to related patent, the disclosure of which is hereby incorporated by reference, by the inventor hereof: U.S. Pat. No. 4,784,318, Nov. 15, 1988.

FIELD OF THE INVENTION

The present invention relates to an apparatus and system to generate, position, cut and fold sheets of materials which carry printed information thereon, generated by a computer assisted design (CAD) apparatus, and more particularly to such a system which optimally utilizes a reproduction substrate, such as a web of paper, even if the sheets carrying the printed material are generated in different sizes and formats.

BACKGROUND

Plotter apparatus, such as the output unit of a computer assisted design (CAD) unit, customarily provides drawings on drawing sheets or pages which frequently must be cut individually to the particular format. After having been cut, these drawing pages then can be folded to standard sizes, for example by hand, or by a folding machine.

THE INVENTION

It is an object to automate the generation of printed drawing sheets, derived from a plotter or other CAD system, in which the plotter generates drawings on a substrate web, typically of paper, which drawings may have, selectively, different size; and to automatically cut these drawings to the appropriate format and then to fold them, eliminating all manual intervention.

Briefly, a plotter includes a program which applies printed material on a substrate web, typically on a paper web, of predetermined width. The program so controls the plotter that the material is applied in printed form on the web so that those formats or sizes of drawings generated by the plotter which are of the same size are located, in groups, on the web to optimally utilize the predetermined width thereof. Longitudinal cuts and cross cuts are then made to sever the individual drawings in the web, in accordance with the respective format, and to form cut drawings; the cut drawings are then fed, individually, to a folder.

In accordance with a feature of the invention, the sheets are fed sequentially to the folder. The sheets, after having been cut, preferably are individually fed and aligned sheets. The sheets, after having been cut, preferably are aligned against an alignment or abutment stop element or groups of elements, or, for example, a stop rail, from which they are then fed to the folder so that the folder will receive the respective sheets in a predetermined position and alignment, regardless of the prior position of the respective cut sheets or drawings on the web.

The plotter program is so arranged that the printed subject matter is placed on the web in the same general direction, that is, places the printed subject matter on the web so that the legend with respect to the drawing will be in a predetermined position.

In accordance with a feature of the invention, a separating table is provided which includes longitudinal and transverse sheet transport means for the cut sheets or drawings; light gates are provided, distributed across the width of the separating table, and associated with possible positions of drawings on the cut sheet, controlling the sequencing circuit and a logic stage to sequentially feed the cut sheets against a stop element, for example a stop rail, for subsequent feeding of the sheets in predetermined position to a sheet folder.

The system has the advantage that drawing sheets, derived from a plotter and which may have different sizes or formats, can be automatically cut from a web, and automatically appropriately folded, without any operator or manual intervention. It, therefore, permits handling of drawings of various sizes and formats while providing, as the output, drawings folded to a predetermined folding pattern.

DRAWINGS

DETAILED DESCRIPTION

Figure 1:
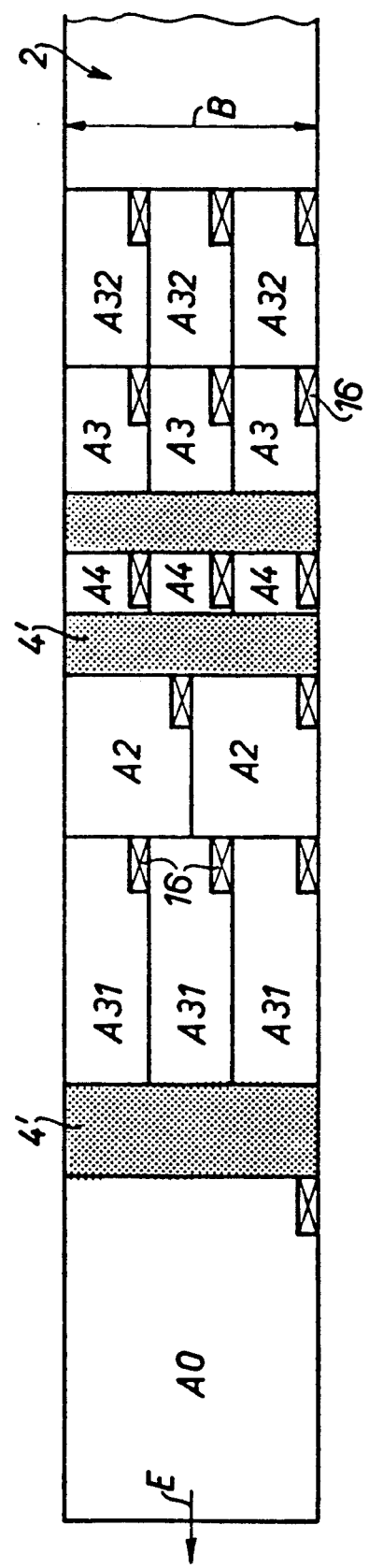
FIG. 1 is a schematic representation of a plurality of drawings of different formats placed on a substrate paper web.
Figure 2:
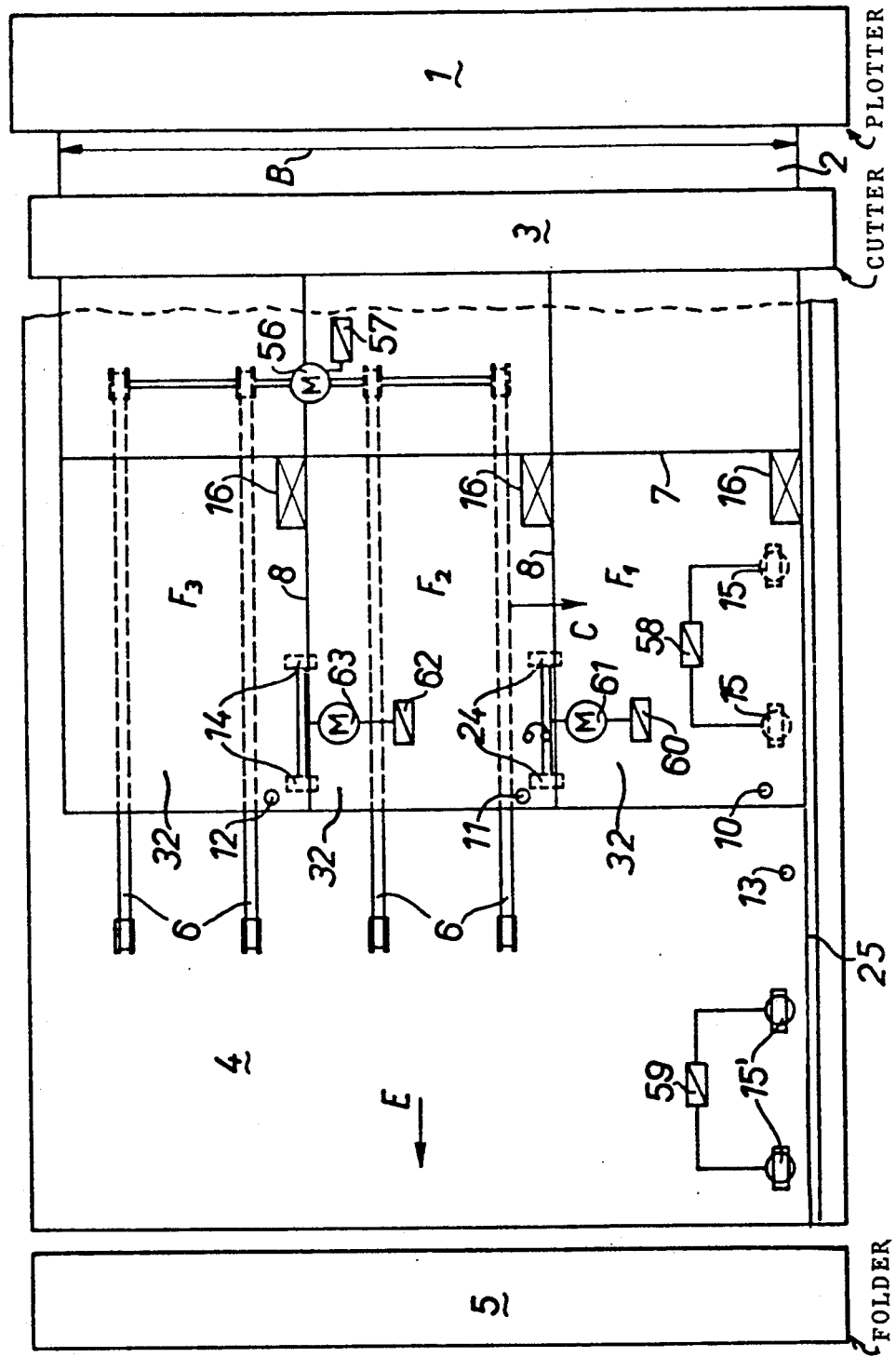
FIG. 2 is a schematic illustration of a top view of a separating table, showing the apparatus and units for cutting, separating and moving drawing sheets, derived from a web.

Referring first to FIGS. 1 and 2:

A plotter 1 (FIG. 2) or a similar computer assisted design (CAD) system to generate images on a web, for example drawings, pictures, writing or the like, prints out the respective subject matter on a web 2, which is transported past the plotter 1 by a suitable transport mechanism, not shown. A typical printing apparatus may, for example, utilize electrostatic reproduction.

The drawings may have predetermined different formats. These formats are standardized, and one standardization system utilizes the DIN standards as follows:

| Designation | Dimension-mm | Approx. Conversion to Inches |
|---|---|---|
| A0 | 841 × 1180 | 33 × 43.5 |
| A1 | 594 × 841 | 23.5 × 33 |
| A2 | 420 × 594 | 16.4 × 23.5 |
| A3 | 297 × 420 | 11.8 × 16.4 |
| A4 | 210 × 297 | 8.3 × 11.8 |
| A31 | 210 × 841 | 8.3 × 33 |
| A32 | 210 × 594 | 8.3 × 23.5 |

The sizes A31 and A32 are special sizes, utilized, for example, for long circuit diagrams. The paper web 2 has a width B, which corresponds to the width of the largest format or size of print which can be generated by the respective CAD plotter 1. It may, for example, correspond to the width of the format A0, that is, have a width, apart from transport margins which may be perforated, of about 845 mm, or somewhat over 33 inches. The customary drawing formats usually use drawing sheets of smaller dimension.

The software of the plotter 1 is so programmed that drawing sheets of the same size and which will fit across the width B are collected in a group or block. The drawings are so arranged and oriented that the legend field 16 is always at the same side, for example adjacent the bottom right corner of the drawing. The number of drawings combined in such a block which are shown in FIG. 2, as an example, at F1, F2, F3, depends on the size of the format of the drawing, optimally using the width B of the web, as clearly appears from FIG. 1. Blank transverse separating strips 4' are preferably provided, to clearly separate the drawings, although this is not strictly necessary. These separating strips, without information content, form scrap which can be discarded.

The continuous web 2, with the information generated thereby appropriately positioned thereon (FIG. 1), is then fed into a cutter 3 (FIG. 2) which cuts or slits the web in transverse and longitudinal direction, by making transverse and longitudinal cuts 7, 8, to generate rectangular drawings in appropriate format of predetermined size, for example of standard sizes A0 to A4 and special sizes A31, A32. A suitable cutter is described in the referenced U.S. Pat. No. 4,784,318, by the inventor hereof, the disclosure of which is hereby incorporated by reference. The plotter is programmed to also apply marginal marks on the sheets, for example in a bar code, or other suitable machinereadable code, which controls the knives or slitters in the cutter 3 to appropriately cut the web. Preferably, the knives for the cross cut 7 are first controlled to make the cross cut at the leading edge, and then the slitters to make the longitudinal cut 8 cut the longitudinal slits which, then, can terminate in a further cross cut adjacent one of the blank strips 4'.

The sequencing is entirely selectable by the operator and, once set, need not be changed. The sequencing of cutting, of course, can be reversed.

The thus generated drawing sheets, for example F1, F2, F3, cut to the predetermined format, are then fed on a separating table 4. They are then fed to a folder 5, of well known construction, as will appear.

The individual, already cut sheets 32 (FIG. 2) are fed to the table 4 by a plurality of transport belts 6, to move the sheets in the direction of the arrow E. Photo-electric sensors, such as photo cells, 10, 11, 12, 13, are located on or in association with the table 4. When the photo cells 10-13 are covered, or block a light beam directed thereto when the sheets 32 are moved in the direction of the arrow E, the transport belt 6 is stopped. Thereafter, the sheet which is immediately adjacent an alignment rail 25 is moved by a transport system 15 towards the folder 5, in the direction of the arrow E. Thereafter, subsequent sheets are moved in engagement with the alignment rail 25, for further transport to the folder 5. The sequencing and control will be explained below.

Figure 3:
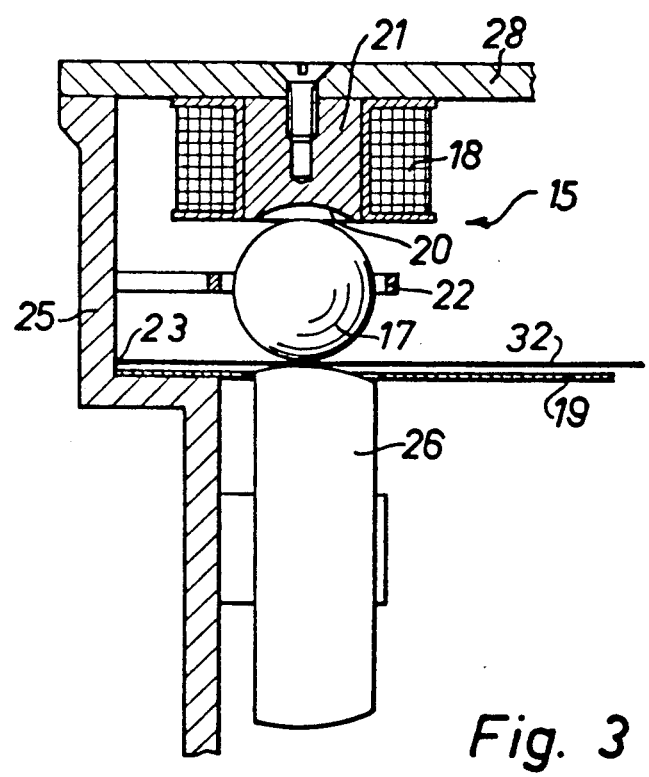
FIG. 3 is a schematic vertical cross-sectional view through a transport arrangement, utilizing a ball transport.

Referring to FIG. 3, the transport system 15 is formed by the combination of a ball 17 and a transport wheel 26, cooperating with a sheet 32 to feed it against, or, depending on the direction of the transport system 15, along the rail 25. The ball 17 is retained, loosely, in a cage 22. A support sheet 19, forming for example part of the table 4, is formed with small openings through which the drive wheel 26 passes in a cutout or slit. The ball 17 can be raised off the surface of the sheet 32 by a solenoid coil 18, wound on a central core 21. The core 21 has a part-spherical segmental recess 20, so that a small gap is provided between the ball 17 and the core 21. When the solenoid 18 is energized under control of a control system—to be described below—the solenoid 18 will attract the ball 17 which, typically, is made of steel, to be lifted off the sheet, thereby interrupting transport. When the ball 17 is dropped, the sheet 32 can engage the stop rail 25, so that the sheet 32 is moved upon rotation of the wheel 26 along the stop rail 25 in the direction of the arrow E towards the folding system 5.

Figure 4:
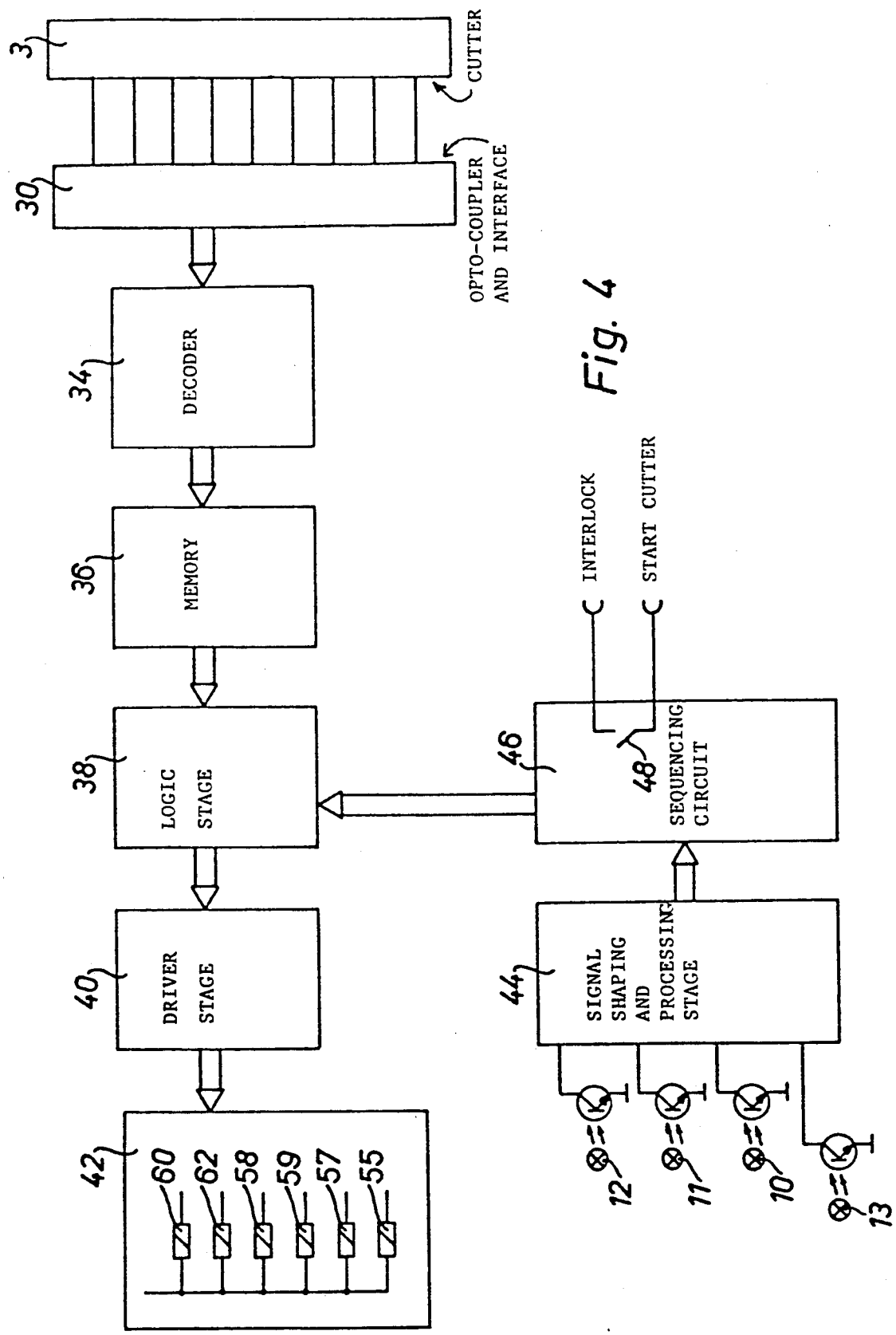
FIG. 4 is a schematic block diagram illustrating the control system for effecting the respective operating steps and controlling the apparatus of FIG. 2.

Referring now to FIGS. 2 and 4: The four light gates 10–13 are so located below or above the separating table 4 that the light gates 10, 11, 12 are positioned on a straight line, transverse to the transport direction E. The light gate 13 is offset in the direction of transport upon movement of the sheet towards the folder 5.

OPERATION

The cutter 3 cuts the web 2 by longitudinal and transverse cuts 8, 7 in rectangular formats to derive cut sheets 32 which are fed to the separating table 4 by four transport belts 6, driven by a motor 56. The sheets 32, thus, are moved in the direction of the arrow E. The motor 56 is energized and de-energized, respectively, by a relay 57, forming a part of a bank of relays 42 (FIG. 4). Let it be assumed that the cutter 3 cuts the web 2 into three sheets F1, F2, F3, each of the format A3. Sheet F3 covers the light gate 12; the second sheet, F2, covers the light gate 11, and the third sheet, F1, covers the light gate 10. As soon as all three light gates 10, 11, 12 are covered, drive motor 56 stops the transport belts 6, that is, relay 57 is de-energized. When this state is sensed, the sheet 32 designated F1 is transported by the ball transport system 15 and 15'—see FIG. 3—in the direction of the arrow E. The current supply to the relays 58, 59 of relays 15, 15', respectively is interrupted, so that the magnets 18 will be de-energized, permitting the balls 17 of the respective transport systems 15, 15' to drop on the sheet F1. The sheet F1, then, is fed by the driven rollers 26 along the lateral engagement rail 25 in the direction of the arrow E. Upon feeding of the sheet, the light gate 10 will become uncovered. When this is sensed, the relay 60 energizes motor 61 to drive the transport rollers 24 for transverse transport, and engage the sheet F2. The sheet F2 is thereby moved in the direction of the arrow C until it engages against the abutment or engagement rail 25. In this position, the light gate 10 is again covered, which de-energizes the solenoids 18 of the respective transport systems 15, 15', so that the sheet F2 is fed in the direction of the arrow E, just like the sheet F1 previously, and in a similar manner. Upon feeding of the sheet F2, the light gate 10 is again uncovered. As a consequence, and as logically sensed by the logic stage 38 and the sequencing stage 46, the relay 60 of the motor 61 as well as the relay 62 of the motor 63 are energized, so that the transport rollers 14 as well as 24 are again operated. This feeds the sheet F3 in the direction of the arrow C until it engages the abutment rail 25. The light gate 10 is now again covered, causing the sheet F3 to be fed by the ball transport systems 15, 15' along the abutment rail 25 in the direction of the arrow E to the folder 5 as described above. At this stage, all three light gates 10, 11, 12 will be uncovered, and the sequencing circuit 46, then, controls the relay 48 to close so that longitudinal transport with the transport belts 6 and the cutter machine 3 can again commence.

It may occur that comparatively long sheets, that is, sheets of a long format such as those of A31, A32 are to be cut. If such sheets are to be handled, the transport belts 6 would be stopped prematurely when a preceding sheet has cleared the light gates 10, 11, 12. Such extra-length sheets, e.g. of format A31 are transported by the longitudinal transport belts 6 while the light gate 13, offset with respect to the light gates 10–12 in the direction of the arrow E, is covered. The cutter 3 cooperates with an optical coupler 30 (FIG. 4), also connected to an interface, since it is necessary to recognize the respective formats of the cut sheets before the cut sheets reach the separating table 4. The opto coupler 30 is connected in parallel with the longitudinal and cross cut system 8, 7 in such a manner that, when the cross cut 8 of the cutting machine is made, the longitudinal transport by belt 6 towards the separating table is stopped, by disconnecting the motor 56, when the light gate 13 is also covered. The sequencing circuit 46 (FIG. 4) with the relay 48 controls an interlock which has the effect that the cutter 3 can supply cut sheets 32 to the separating table 4 only when all the light gates are uncovered.

It is, of course, equally possible to set the light gate 13 behind the light gates 10, 11, 12—with respect to the transport direction E—and then suitably modifying the control software by interrupting longitudinal transport when the preceding or pre-positioned light gate is no longer covered.

The ball transport systems 15, 15' of the associated relays 58, 59 are so connected and programmed that the ball transport system is connected by the associated magnet controlling the rollers 14, 24, 26 to lift the balls 17 unless transport is desired, since the sheets could not readily slip between the rollers 14, 24, 26, respectively, if the balls 17 were in engagement therewith.

The connecting system of FIG. 4 further shows that the opto coupler 30 is connected to a decoding stage 34, typically an EPROM, which, in turn, is connected to a memory 36 which is coupled to a logic stage 38. The logic stage controls a driver stage 40 which is connected to drive the respective relays 55, 57, 58, 59, 60, 62 of the relay block 42; of course, the relays can be replaced by other suitable switching elements. The outputs of the light gates 10-13 are coupled to a signal shaping and processing stage 44, of suitable circuitry, which, in turn, is connected to the sequencing circuit 46, coupled to the logic stage 38.

The invention has been described with an example in which three sheets 32 are sequentially fed to the folder 5. Of course, a larger or smaller number of sheets can be cut from the web 2, and it is only necessary to suitably program the cutter 3 to cut the sheets as derived from the CAD plotter 2; the system will then, automatically, adapt itself in similar, but modified operation to automatically feed the respective cut sheets against the engagement element 25, typically a rail, for subsequent folding by the folding apparatus 5, which can be tied electrically to the plotter and/or the cutter to effect appropriate folding in accordance with the format of the respective sheet, as cut by the cutter 3. Information or data relating to that format is available in electronic form from CAD 1 and the cutter 3.

Various changes and modifications may be made; the respective elements are all well known structures, available commercially as units, or, respectively, as described in the referenced U.S. Pat. No. 4,784,318, by the inventor hereof.

Suitable electrostatic plotters 1 are manufactured by and available from Versatec Headquarters, Santa Clara, Calif., or Sanders California Computer Products, Inc., Anaheim, Calif., or Hewlett Packard, San Diego, Calif. A program which optimally aligns the respective drawings for such plotters is available from SwS software Service GmbH, Eschweiler, Germany, or from O. Bay aG, Subingen, Switzerland.

A suitable folder 5 is described in Europ. patent publication no. 89810540.8, corresponding to U.S. Ser. No. 07/399 584, now U.S. Pat. No. 5,645,039.

I claim:

1. A system for individually feeding printed material in sheet form separated from a web (2) having different size or different format to a folding apparatus (5) for folding said printed material in sheet form, comprising
a separating table (4) having a separating surface;
first longitudinal transport means (6) for parallel feeding of at least two sheets (32) on said separating surface in a longitudinal transport direction (E);
transverse transport means (24) for feeding said sheets (32) in transverse direction (C) with respect to said first transport direction on said separating surface;
alignment or stop means (25) operatively associated with said separating surface and defining a reference position thereon;
a plurality of sheet position sensing means (10, 11, 12, 13) operatively associated with said separating surface and sensing the position and presence of sheets (32) on said separating surface, said sensing means (10, 11, 12, 13) being individually distributed transversely with respect to the separating surface;
second longitudinal transport means (15, 15') positioned for feeding a sheet adjacent said reference position in said longitudinal transport direction (E) to said folding apparatus (5); and
control means (38, 44, 46) coupled to
said sheet sensing means (10, 11, 12, 13),
said longitudinal transport means (6),
said transverse transport means (24) and
said second transport means,
said control means being responsive to said sheet sensing means and controlling operation of said longitudinal transport means, said transverse transport means and said second transport means in accordance with the position of said sheets on said separating surface,
wherein said control means controls
said second longitudinal transport means (15, 15') to first feed a sheet, when in the reference position, in said longitudinal transport direction (E) to said folding apparatus,
then controls said transverse transport means (24) to move another sheet on said separating surface to said reference position and
then again activate said second longitudinal transport means (15, 15') to move said other sheet from said reference position in said longitudinal transport direction (E) to said folding apparatus (5).

2. The system of claim 1, wherein said sheet sensing means comprise optical gates.

3. The system of claim 1, wherein said alignment or stop means comprises a sheet engagement or abutment element (25).

4. The system of claim 3, wherein said sheet engagement or abutment element comprises an alignment rail extending parallel to said longitudinal transport direction (E).

5. The system of claim 1, wherein said sheet transport means (15) comprises a selectively operable or energizable transport means.

6. The system of claim 1, wherein at least one of said transport means comprises a transport roller (26) located beneath said separating surface (4) and slightly penetrating therethrough to permit engagement of said roller with a sheet (32) and a loosely retained ball (17) of ferromagnetic material; and solenoid means positioned above said ball (17) for, selectively, lifting said ball off said roller to permit placement of a sheet between said lifted ball and said roller, and, upon de-energization of the solenoid, dropping the ball on said roller to permit feeding the sheet upon rotation of said roller.

7. The system of claim 6, wherein said control means (38, 44, 46) selectively controls energization of said solenoid, and hence engagement of the roller with a sheet and feeding of the sheet.

8. The system of claim 7, wherein said control means controls energization of the solenoid in dependence on sensed position of sheets sensed by said sensing means (10, 11, 12, 13).

9. The system of claim 1, including longitudinal transport motor drive means (56), operating at least one of said longitudinal transport means;

at least one transverse transport motor drive means (60, 62) operating said transverse transport means;

wherein said control means (38, 44, 46) selectively controls said longitudinal transport motor drive means (56) and said transverse transport motor drive means (60, 62), in dependence on sensed position of at least one sheet (32) on at least one of said sheet position sensing means (11, 12); and wherein said sheet transport means (15) are further controlled by said control means (38, 44, 46) in dependence on sensing by one of said position sensing means (10, 15) of a sheet in the reference position, for feeding said sheet from said reference position in a direction (E) parallel to the longitudinal direction of the web to said folding apparatus (5).

10. The system of claim 9, wherein said longitudinal transport means comprises transport belt means (6) operatively coupled to said longitudinal transport motor drive means (56).

11. The system of claim 10, wherein said transport belt means comprises a plurality of transport belts, distributed across the width of said separating surface, transversely to the longitudinal direction of the web (2) and in the feeding direction (E) of said sheets.

12. The system of claim 1, wherein at least some of the sheet position sensing means comprises light gates, which are arranged in a line extending transversely to the width of the web (2) and to a feeding direction (E) to the holder (5) at a side of the separating surface for sensing the position of the sheets on the separating surface (4).

13. The system of claim 12, wherein the separating surface comprises a separating table.

14. The system of claim 1, wherein said position sensing means comprises a first group (10-12) of light gates located in essential alignment along a line transverse to the feeding direction (E) from the reference to said folder (5) and at least one further light gate (13) located laterally offset with respect to said aligned first group of light gates for sensing when the reference position is clear to receive a sheet sequential to that sheet which previously had been transported by said sheet transport means (15, 15') to the folder.

15. The system of claim 1, wherein said sheet position sensing means comprises optical sheet position sensing means (10, 11, 12, 13) operatively associated with said separating surface and sensing the position and presence of sheets (32) on said separating surface; and wherein said optical sensing means comprise a group (10-12) of light gates located in essential alignment along a line transverse to said first feeding direction (E).

16. The system of claim 15, wherein said alignment or stop means (25) comprises an alignment rail extending parallel to said longitudinal transport direction (E).

17. The system of claim 16, wherein at least one of said transport means comprises a transport roller (26) located beneath said separating surface (4) and slightly penetrating thereover to permit engagement of said roller with a sheet (32) and a loosely retained ball (17) of ferromagnetic material; and solenoid means positioned above said ball (17) for, selectively, lifting said ball off said roller to permit placement of a sheet between said lifted ball and said roller, and, upon de-energization of the solenoid, dropping the ball on said roller to permit feeding the sheet upon rotation of said roller.

18. The system of claim 17, wherein another one of said transport means comprises transport belt means (6) and transport motor drive means (56) operatively coupled to said transport belt means (6).

19. The system of claim 1, wherein at least one of said longitudinal transport means comprises a transport belt means (6) and a transport motor drive means (56) operatively coupled to said transport belt means (6).

* * * * *